(12) United States Patent
Uchida

(10) Patent No.: US 8,939,255 B2
(45) Date of Patent: Jan. 27, 2015

(54) MOTORCYCLE

(71) Applicant: Yamaha Hatsudoki Kabushiki Kaisha, Iwata-shi, Shizuoka (JP)

(72) Inventor: Takahisa Uchida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/063,057

(22) Filed: Oct. 25, 2013

(65) Prior Publication Data

US 2014/0353077 A1 Dec. 4, 2014

(30) Foreign Application Priority Data

May 31, 2013 (JP) ................................. 2013-115422

(51) Int. Cl.
*F01N 13/08* (2010.01)
*F01N 1/08* (2006.01)

(52) U.S. Cl.
CPC ........................................ *F01N 1/08* (2013.01)
USPC ............................ 181/228; 181/237; 181/254

(58) Field of Classification Search
CPC ...................................................... F01N 13/08
USPC .......................................... 181/228, 237, 254
See application file for complete search history.

(56) References Cited

U.S. PATENT DOCUMENTS

| 4,422,519 A * | 12/1983 | Nomura et al. ................ 180/219 |
| 6,598,390 B2 * | 7/2003 | Chang .............................. 60/323 |
| 6,938,729 B2 * | 9/2005 | Worner et al. ................. 181/254 |
| 7,637,349 B2 * | 12/2009 | Harada .......................... 181/265 |
| 7,895,832 B2 * | 3/2011 | Gruber ........................... 60/299 |
| 7,905,320 B2 * | 3/2011 | Ishikawa et al. .............. 181/254 |
| 2005/0082113 A1 * | 4/2005 | Okunosono ................... 181/227 |
| 2011/0225953 A1 | 9/2011 | Ono et al. |

FOREIGN PATENT DOCUMENTS

JP 2011-196242 A 10/2011

* cited by examiner

*Primary Examiner* — Forrest M Phillips
(74) *Attorney, Agent, or Firm* — Keating & Bennett, LLP

(57) ABSTRACT

A motorcycle includes a second silencer separate from a first silencer. A first exhaust pipe connects an exhaust port and the first silencer. A connecting pipe portion connects the first silencer and the second silencer. A first expansion chamber of the first silencer is located downstream from the first exhaust pipe in the exhaust flow. A second expansion chamber of the first silencer is partitioned from the first expansion chamber. The second expansion chamber is located downstream from the first expansion chamber. The connecting pipe portion includes a second exhaust pipe, an exhaust control valve, and a third exhaust pipe. The second exhaust pipe is connected to the first expansion chamber. The exhaust control valve is disposed in the second exhaust pipe. The exhaust control valve controls the flow passage area of the second exhaust pipe. The third exhaust pipe is connected to the second expansion chamber.

13 Claims, 14 Drawing Sheets

MOTORCYCLE

BACKGROUND OF THE INVENTION

1. Field of the Invention

The present invention relates to a motorcycle.

2. Description of the Related Art

A motorcycle is generally provided with a silencer. For example, the motorcycle disclosed in Japanese Laid-Open Patent Publication JP-A-2011-196242 includes an exhaust chamber and a muffler. The exhaust chamber is disposed between an engine and a rear wheel in the front-back direction of the vehicle. The muffler is disposed beside the rear wheel. The exhaust chamber and the muffler function as a silencer. Providing a plurality of silencers in this manner allows for an improvement in a silencing function.

An exhaust chamber in the motorcycle disclosed in Japanese Laid-Open Patent Publication JP-A-2011-196242 has three expansion chambers, and a chamber outlet pipe is connected to the expansion chamber that is the most downstream in the exhaust flow. As a result of this arrangement, expansion of the exhaust is repeated a plurality of times in the exhaust chambers. The passage length of the exhaust in the exhaust chambers is elongated. As a result, the noise reduction function is further improved. Moreover, an exhaust control valve is provided in the chamber outlet pipe. The amount of exhaust fed from the exhaust chamber to the muffler is controlled by opening and closing actions of the exhaust control valve.

The exhaust chamber of the motorcycle disclosed in Japanese Laid-Open Patent Publication JP-A-2011-196242 has a plurality of expansion chambers, and the chamber outlet pipe is connected to the expansion chamber that is the furthest downstream. As a result of this arrangement, while the silencing function is improved, output performance tends to be reduced especially when travelling at high speeds due to an increase in back pressure.

In order to improve output performance when traveling at high speeds, the passage surface areas of the chamber outlet pipe and of the inlet pipe in the exhaust chamber may be increased in the exhaust chamber described above. However, in this case the exhaust chamber would become much larger.

By reducing the number of expansion chambers in the exhaust chamber to one, or by reducing the exhaust passage length, the output performance of the engine when traveling at high speeds can be improved while preventing the exhaust chamber from becoming much larger. However, there is a problem that the silencing function will be reduced in this case. A good silencing function is desirable from the point of view of noise problems near the motorcycle. In particular, since a motorcycle often travels in places that are affected by noise such as urban and suburban areas when traveling at slow speeds, there is a desire for a good silencing performance at slow speeds.

SUMMARY OF THE INVENTION

In order to overcome the problems described above, preferred embodiments of the present invention improve the silencing performance of a silencer in a motorcycle when traveling at slow speeds, reduce the size of the silencer, and improve the output performance when traveling at high speeds.

A motorcycle according to a first preferred embodiment includes an engine, a first silencer, a second silencer, a first exhaust pipe, and a connecting pipe portion. The engine includes an exhaust port. The second silencer is separate from the first silencer. The first exhaust pipe connects the exhaust port and the first silencer. The connecting pipe portion connects the first silencer and the second silencer. The first silencer includes a first expansion chamber and a second expansion chamber to expand the exhaust. The first expansion chamber is located downstream from the first exhaust pipe in the exhaust flow. The second expansion chamber is partitioned from the first expansion chamber. The second expansion chamber is located downstream from the first expansion chamber. The connecting pipe portion includes a second exhaust pipe, an exhaust control valve, and a third exhaust pipe. The second exhaust pipe is connected to the first expansion chamber. The exhaust control valve is disposed in the second exhaust pipe. The exhaust control valve controls the flow passage area of the second exhaust pipe. The third exhaust pipe is connected to the second expansion chamber.

The exhaust in the motorcycle according to the present preferred embodiment flows from the exhaust port of the engine through the first exhaust pipe, the first silencer, the connecting pipe portion, and the second silencer in that order. The passage length of the exhaust in the first silencer can be modified by controlling the flow passage area of the second exhaust pipe with the exhaust control valve. For example, by closing the exhaust control valve, the exhaust flows from the first exhaust pipe through the first expansion chamber and the second expansion chamber to the third exhaust pipe. Moreover, by opening the exhaust control valve, the exhaust flows mainly from the first exhaust pipe through the first expansion chamber to the second exhaust pipe without passing through the second expansion chamber. Therefore, the silencing performance can be improved by closing the exhaust control valve to increase the passage length when traveling at slow speeds. The output performance can be improved by opening the exhaust control valve to decrease the passage length when traveling at high speeds. Moreover, since the output performance can be improved without increasing the passage areas of the expansion chambers and the exhaust pipes, the first silencer can be made smaller. Furthermore, since the silencing performance can be improved by the first silencer, the second silencer can be made smaller.

The motorcycle is provided with a rear wheel disposed rearward of the engine, and at least a portion of the first silencer is preferably disposed between the engine and the rear wheel in the front-back direction of the vehicle. The second silencer is preferably disposed beside the rear wheel.

An increase in the size of the silencers disposed at these locations causes the banking angle of the vehicle body to become smaller. Since the first silencer and the second silencer can be made smaller in the motorcycle according to the present preferred embodiment, a reduction in the banking angle of the vehicle body can be prevented or minimized. Moreover, the degree of freedom for the layout of the silencers is improved.

The flow passage area of the third exhaust pipe is preferably no greater than the maximum flow passage area of the second exhaust pipe. In this case, the silencing performance is improved. In other words, the maximum flow passage area of the second exhaust pipe is no less than the flow passage area of the third exhaust pipe. As a result, the output performance is improved.

The internal diameter of the third exhaust pipe is preferably no greater than the internal diameter of the second exhaust pipe. In this case, the flow passage area of the third exhaust pipe is no greater than the maximum flow passage area of the second exhaust pipe.

The second exhaust pipe is preferably disposed higher than the third exhaust pipe. In this case, the exhaust control valve is disposed farther away from the ground surface since the exhaust control valve is disposed on the second exhaust pipe. As a result, the exhaust control valve can be prevented from coming into contact with the ground surface.

The length of the second exhaust pipe is preferably shorter than the length of the third exhaust pipe. In this case, the passage length of the exhaust can be shortened when the exhaust control valve is open. Accordingly, output performance is improved.

The first silencer preferably includes a partition wall member. The partition wall member partitions the first expansion chamber and the second expansion chamber. The first expansion chamber and the second expansion chamber are disposed adjacent to each other with the partition wall member interposed therebetween. The first exhaust pipe is connected to the first expansion chamber.

In this case, by closing the exhaust control valve, the exhaust flows from the first exhaust pipe through the first expansion chamber and the second expansion chamber to the third exhaust pipe. Moreover, by opening the exhaust control valve, the exhaust flows mainly from the first exhaust pipe through the first expansion chamber to the second exhaust pipe without passing through the second expansion chamber.

The first silencer preferably includes a third expansion chamber to allow expansion of the exhaust. The third expansion chamber is located upstream from the first expansion chamber in the exhaust flow. The first exhaust pipe is connected to the third expansion chamber.

In this case, by closing the exhaust control valve, the exhaust flows from the first exhaust pipe through the third expansion chamber, the first expansion chamber, and the second expansion chamber to the third exhaust pipe. Moreover, by opening the exhaust control valve, the exhaust flows mainly from the first exhaust pipe through the third expansion chamber and the first expansion chamber to the second exhaust pipe without passing through the second expansion chamber.

The first silencer preferably includes a third expansion chamber to allow expansion of the exhaust. The third expansion chamber is located between the first expansion chamber and the second expansion chamber in the exhaust flow. The first exhaust pipe is connected to the first expansion chamber.

In this case, by closing the exhaust control valve, the exhaust flows from the first exhaust pipe through the first expansion chamber, the third expansion chamber, and the second expansion chamber to the third exhaust pipe. Moreover, by opening the exhaust control valve, the exhaust flows mainly from the first exhaust pipe through the first expansion chamber to the second exhaust pipe without passing through the third expansion chamber or the second expansion chamber.

The first silencer preferably includes a plurality of expansion chambers including the first expansion chamber and the second expansion chamber. The second exhaust pipe is connected to the expansion chamber located furthest to the rear among the plurality of expansion chambers.

In this case, the length of second exhaust pipe can be reduced. Specifically, the passage length of the exhaust can be shortened when the exhaust control valve is open. Accordingly, output performance is improved.

The first silencer preferably includes a body portion and an expansion portion. The expansion portion expands upward from the body portion. The connecting pipe portion is connected to the expansion portion. In this case, the distance between the bottom of the first silencer and the ground surface is prevented from becoming too small.

The motorcycle preferably includes a rear arm, a suspension, and a link portion. The rear arm is disposed above the main body. The link portion couples the suspension and the rear arm. The expansion portion is disposed beside the link portion. In this case, the first silencer can be disposed in a compact manner while avoiding interference with the link portion.

The exhaust control valve preferably makes the flow passage area of the second exhaust pipe when the engine rotation speed is within a certain low-speed range smaller than the flow passage area of the second exhaust pipe when the engine rotation speed is within a certain high-speed range that is greater than the certain low-speed range. In this case, the flow passage area of the second exhaust pipe is controlled in accordance with the engine rotation speed. As a result of this arrangement, a state for achieving a high output performance can be switched with a state for achieving a high silencing performance in accordance with the speed of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
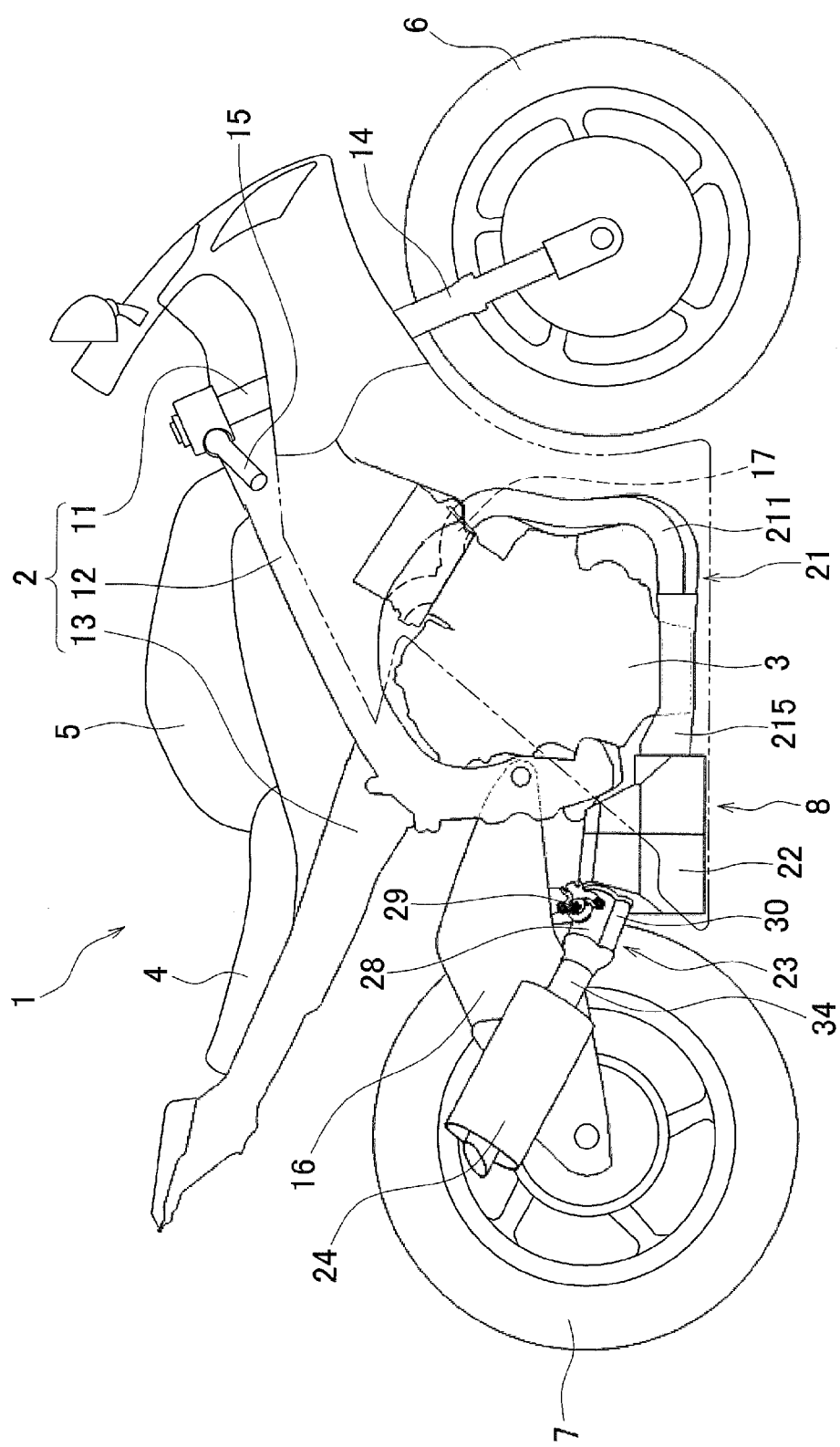
FIG. 1 is a side view of a motorcycle according to a first preferred embodiment of the present invention.

A motorcycle 1 according to a first preferred embodiment of the present invention is illustrated in FIG. 1. FIG. 1 is a side view of the motorcycle 1. In the following description, unless otherwise noted, front, rear, left and right refer to the directions as seen from a rider sitting on the motorcycle 1. The motorcycle 1 is provided with a vehicle frame 2, an engine 3, a seat 4, a fuel tank 5, a front wheel 6, and a rear wheel 7.

The vehicle frame 2 includes a head pipe 11, a main frame 12, and a rear frame 13. A front fork 14 is supported in a rotatable manner on the head pipe 11. A handlebar 15 is fixed to the upper end of the front fork 14. The front wheel 6 is supported in a rotatable manner at the lower portion of the front fork 14.

The main frame 12 supports the engine 3. A rear arm 16 is coupled to the rear portion of the main frame 12 in a manner that allows swinging up and down. The rear wheel 7 is supported in a rotatable manner on the rear portion of the rear arm 16. The rear wheel 7 is disposed rearward of the engine 3. The rear frame 13 is disposed rearward of the main frame 12. The seat 4 and the fuel tank 5 are disposed above the vehicle frame 2. The fuel tank 5 is disposed in front of the seat 4.

The engine 3 transmits driving power to the rear wheel 7 via transmission members such as a shaft or a chain which are not illustrated. The engine 3 is disposed below the fuel tank 5 and is attached to the main frame 12.

The motorcycle 1 includes an exhaust device 8. The exhaust device 8 includes a first exhaust pipe 21, a first silencer 22, a connecting pipe portion 23, and a second silencer 24. The first exhaust pipe 21 is connected to an exhaust port 17 of the engine 3 and the first silencer 22. The first exhaust pipe 21 extends downward from the exhaust port 17 in front of the engine 3. The first exhaust pipe 21 bends toward the rear in front of the engine 3. The first exhaust pipe 21 extends toward the rear below the engine 3.

Figure 2:
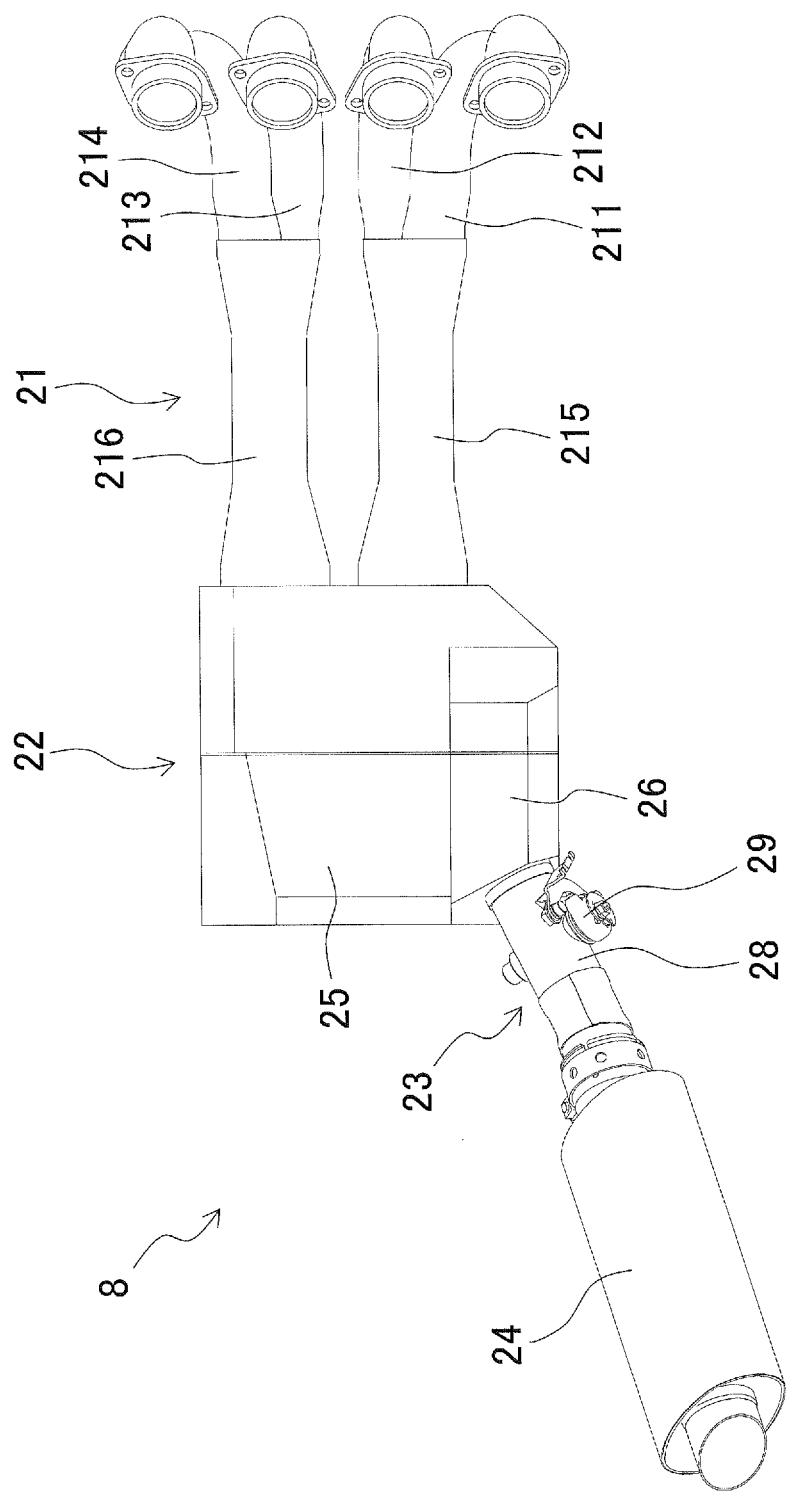
FIG. 2 is a plan view of an exhaust device.

FIG. 2 is a plan view of the exhaust device 8. As illustrated in FIG. 2, the first exhaust pipe 21 includes a plurality of exhaust pipes 211 to 214 and a plurality of collecting pipes 215 and 216. The plurality of exhaust pipes 211 to 214 are connected to the exhaust port 17 of the engine 3. The plurality of collecting pipes 215 and 216 are connected to the plurality of exhaust pipes 211 to 214. The plurality of collecting pipes 215 and 216 are connected to the first silencer 22. The plurality of collecting pipes 215 and 216 are disposed in a row on the left and right. In the present preferred embodiment, the first exhaust pipe 21 preferably includes four exhaust pipes 211 to 214 and two collecting pipes 215 and 216, for example. Hereinbelow, one of the two collecting pipes 215 and 216 is referred to as a first collecting pipe 215, and the other is referred to as a second collecting pipe 216. Two exhaust pipes are connected to one collecting pipe. Specifically, the two exhaust pipes 211 and 212 are connected to the first collecting pipe 215. The two exhaust pipes 213 and 214 are connected to the second collecting pipe 216. As illustrated in FIG. 1, the collecting pipes 215 and 216 are disposed below the engine 3.

The first silencer 22 is disposed rearward of the collecting pipes 215 and 216. At least a portion of the first silencer 22 is disposed between the engine 3 and the rear wheel 7 in the front-back direction of the vehicle. At least a portion of the first silencer 22 is disposed below the rear arm 16. The lower surface of the first silencer 22 is preferably located lower than the lower end portion of the engine 3. The upper surface of the first silencer 22 is preferably located higher than the lower end portion of the engine 3.

Figure 3:
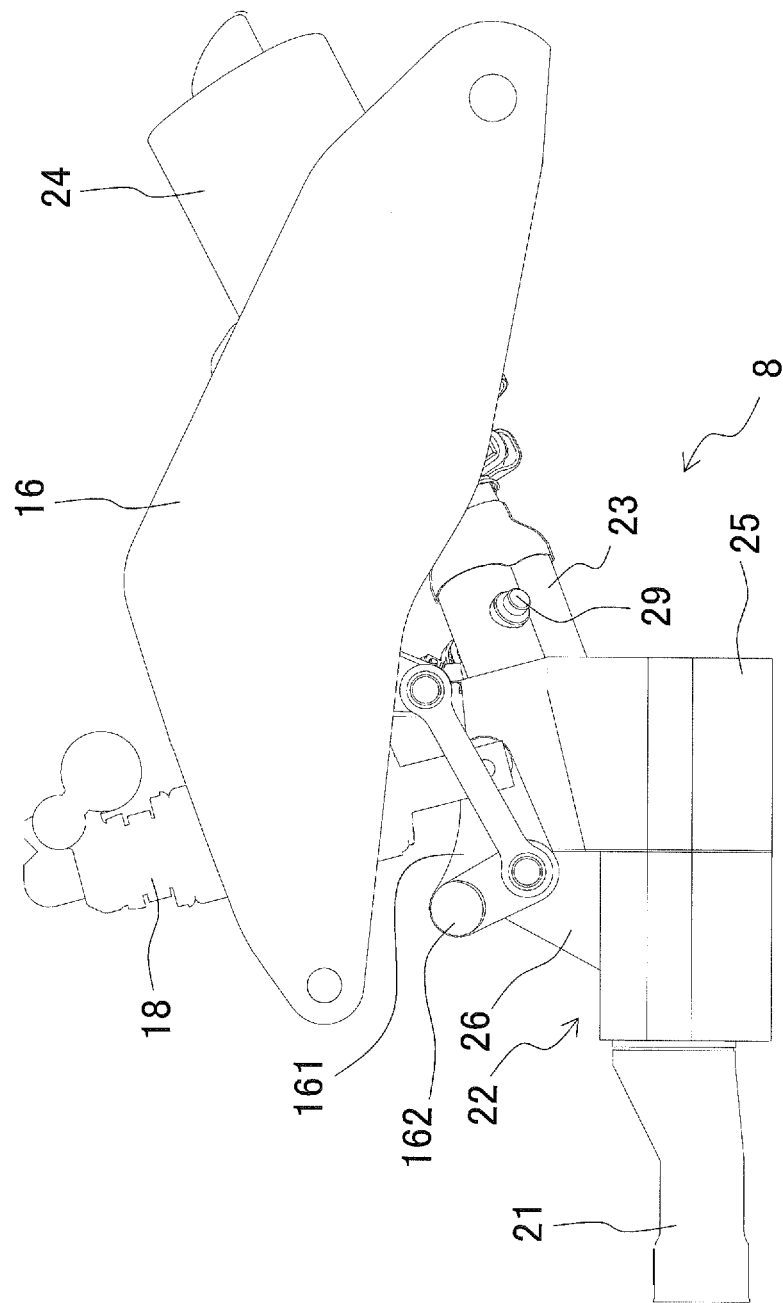
FIG. 3 is a side view of the exhaust device.
Figure 4:
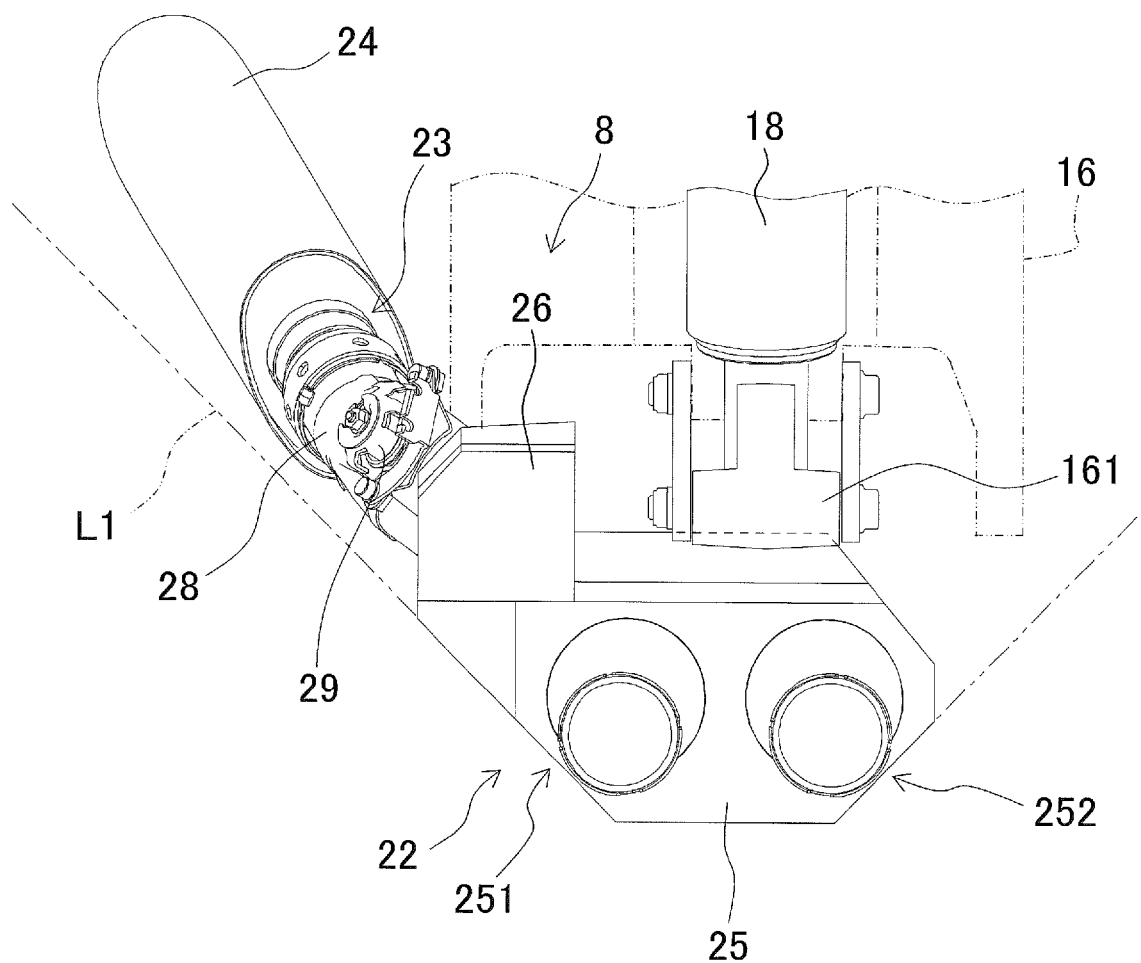
FIG. 4 is a front view of the exhaust device.
Figure 5:
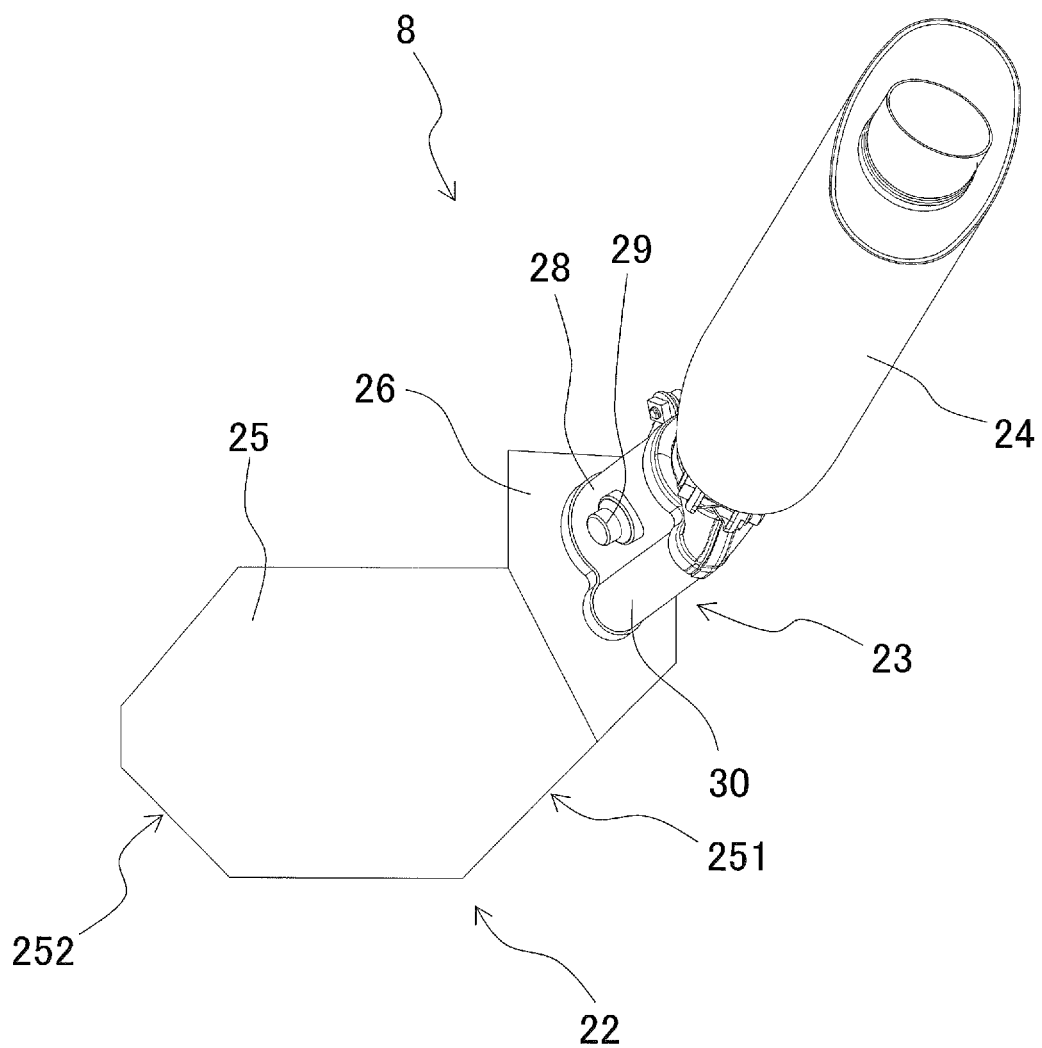
FIG. 5 is a rear view of the exhaust device.

FIG. 3 is a side view of the exhaust device 8. FIG. 4 is a front view of the exhaust device 8. FIG. 5 is a rear view of the exhaust device 8. As illustrated in FIGS. 3 to 5, the first silencer 22 includes a body portion 25 and an expansion portion 26. The first exhaust pipe 21 is connected to the body portion 25. The body portion 25 is located below the rear arm 16. Specifically, the rear arm 16 is disposed above the body portion 25. As illustrated in FIG. 3, the rear arm 16 is coupled to a rear suspension 18 via a link portion 161. The link portion 161 includes a coupling portion 162 and is coupled to the main frame 12 by the coupling portion 162. The bottom surface of the body portion 25 includes a right tapered surface 251 and a left tapered surface 252. The right tapered surface 251 is inclined to the right and upward as seen from the front of the vehicle. The left tapered surface 252 is inclined to the left and upward as seen from the front of the vehicle. The second silencer 24 is disposed so as not to intersect with an extension line L1 of the right tapered surface 251 as seen from the front of the vehicle. The second silencer 24 is disposed above the extension line L1 of the right tapered surface 251 as seen from the front of the vehicle.

The expansion portion 26 expands upward from the body portion 25. As illustrated in FIG. 2 in detail, the expansion portion 26 is provided on a right side portion of the upper surface of the body portion 25. The expansion portion 26 has a shape that extends in the front-back direction. As illustrated in FIG. 4, the expansion portion 26 is located beside the link portion 161. Specifically, the expansion portion 26 is located on the right side of the link portion 161.

The connecting pipe portion 23 connects the first silencer 22 and the second silencer 24. The connecting pipe portion 23 is connected to the expansion portion 26.

The second silencer 24 is separate from the first silencer 22. The second silencer 24 is disposed farther to the rear than the first silencer 22. The second silencer 24 is disposed beside the rear arm 16. The second silencer 24 is disposed beside the rear wheel 7. The second silencer 24 is disposed on the right side of the rear wheel 7. At least a portion of the second silencer 24 is located higher than the first silencer 22. The second silencer 24 is disposed so as to extend obliquely to the rear and upward. The second silencer 24 preferably has a cylindrical or substantially cylindrical shape, for example.

Figure 6:
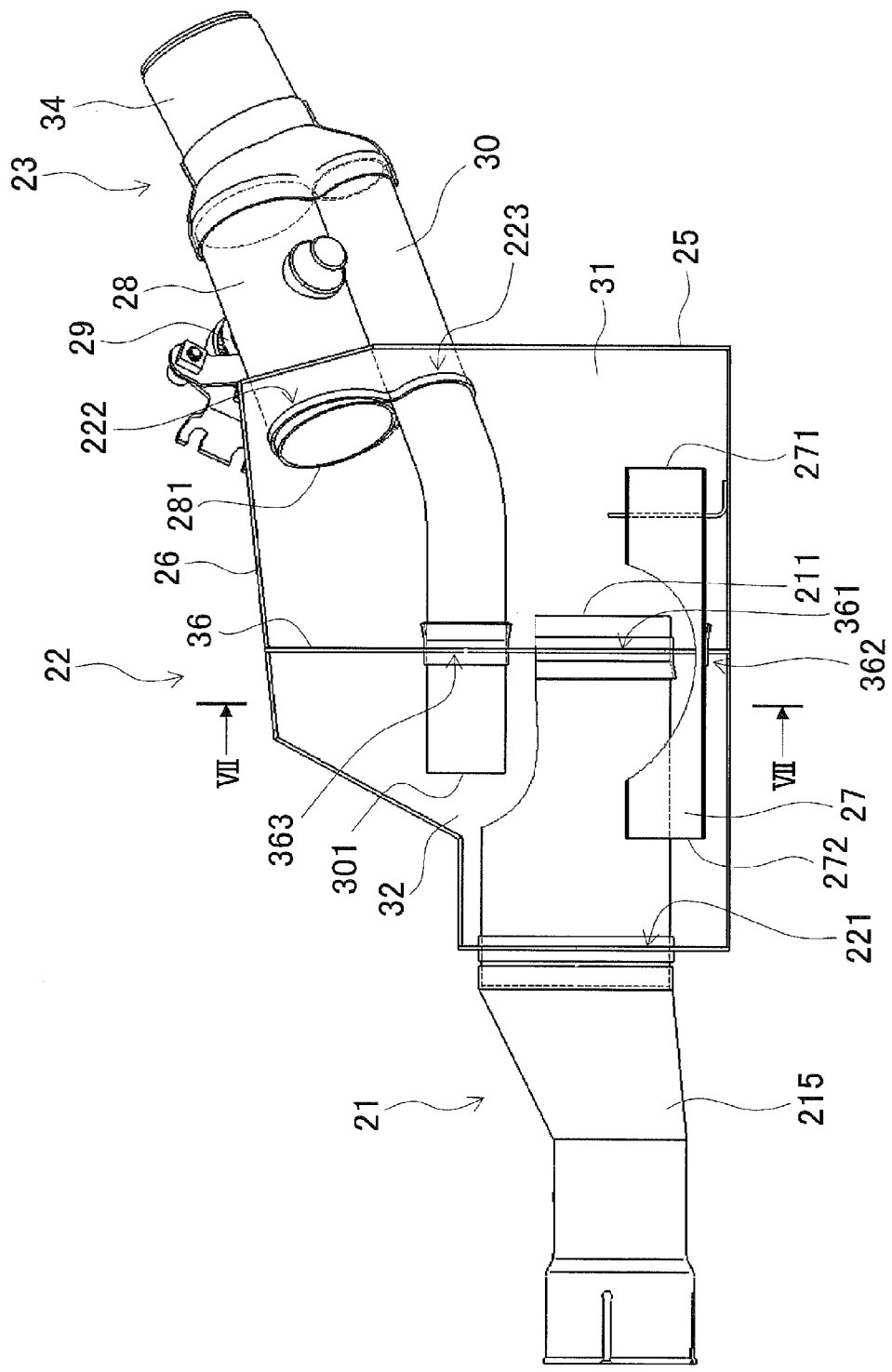
FIG. 6 is aside cross-sectional view of a first silencer.
Figure 7:
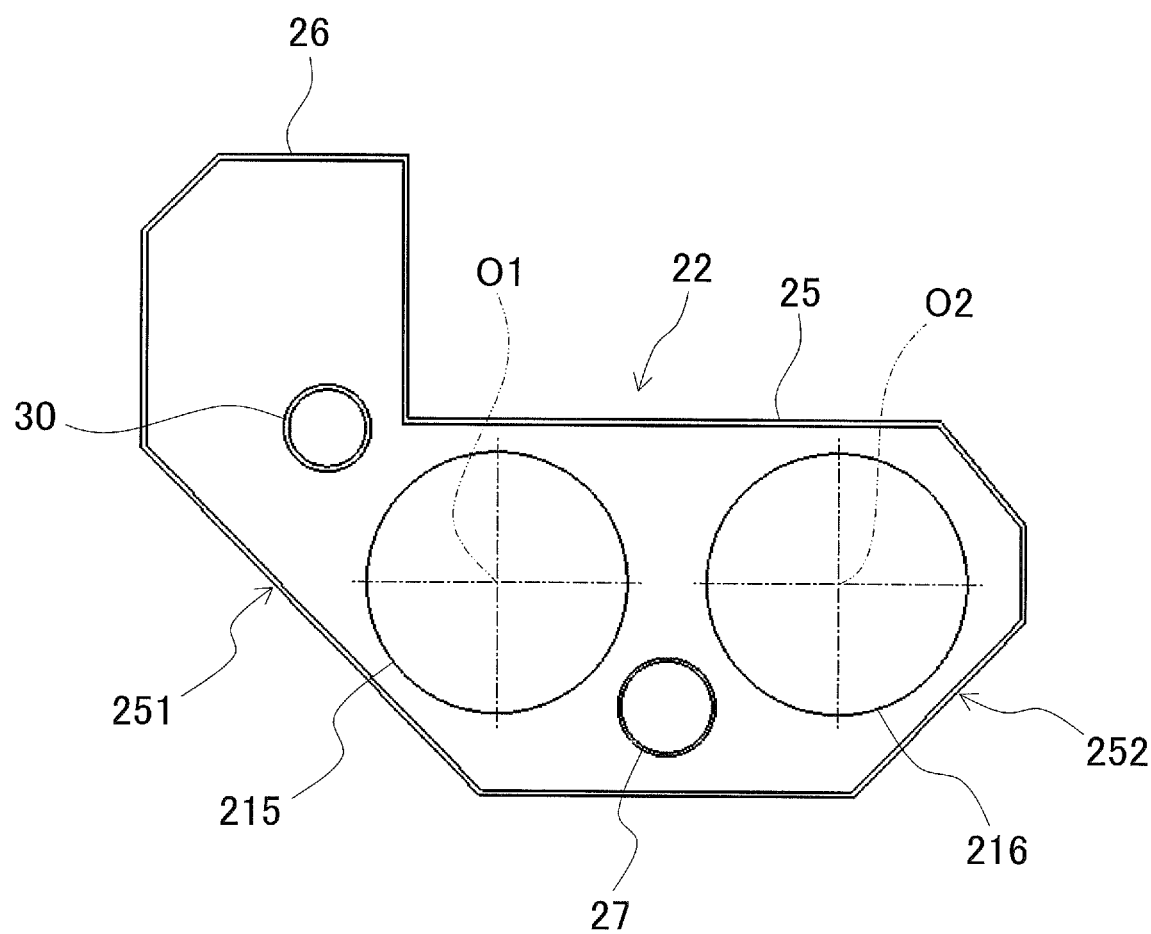
FIG. 7 is a cross-section along line VII-VII of the first silencer in FIG. 6.

FIG. 6 is a side cross-sectional view of the first silencer 22. FIG. 7 is a cross-section along line VII to VII of the first silencer 22 in FIG. 6. A portion of the first exhaust pipe 21 is omitted in FIG. 6 to allow for ease of understanding. As illustrated in FIG. 6, the inside of the first silencer 22 is partitioned into two expansion chambers 31 and 32 to allow the exhaust to expand. Specifically, the first silencer 22 includes a first expansion chamber 31 and a second expansion chamber 32. The first silencer 22 includes a partition wall member 36. The partition wall member 36 partitions the first expansion chamber 31 and the second expansion chamber 32. The first expansion chamber 31 and the second expansion chamber 32 are disposed adjacent to each other with the partition wall member 36 interposed therebetween.

The first expansion chamber 31 includes a flow passage area and a volume larger than those of the first exhaust pipe 21. As a result of this arrangement, exhaust expands in the first expansion chamber 31. The first expansion chamber 31 is located rearward of the second expansion chamber 32. The first expansion chamber 31 is located farther downstream than the first exhaust pipe 21 in the exhaust flow. The first exhaust pipe 21 is connected to the first expansion chamber 31. The first exhaust pipe 21 is disposed so as to pass through a hole 221 in the front surface of the first silencer 22, the second expansion chamber 32, and a hole 361 in the partition wall member 36. An end portion 211 of the first exhaust pipe 21 is disposed inside the first expansion chamber 31.

The second expansion chamber 32 has a flow passage area and a volume larger than those of the first exhaust pipe 21. As a result, exhaust expands in the second expansion chamber 32. The second expansion chamber 32 is partitioned from the first expansion chamber 31. The second expansion chamber 32 is located farther downstream than the first expansion chamber 31 in the exhaust flow. The second expansion chamber 32 is located in front of the first expansion chamber 31.

The exhaust device 8 includes an internal connecting pipe 27. A portion of the internal connecting pipe 27 is omitted in FIG. 6 to allow for ease of understanding. The internal connecting pipe 27 connects the first expansion chamber 31 with the second expansion chamber 32. Specifically, a first end portion 271 of the internal connecting pipe 27 is disposed inside the first expansion chamber 31. A second end portion 272 of the internal connecting pipe 27 is disposed inside the second expansion chamber 32. The internal connecting pipe 27 is disposed so as to pass through a hole 362 in the partition wall member 36. The first end portion 271 of the internal connecting pipe 27 is located rearward of the end portion 211 of the first exhaust pipe 21. As illustrated in FIG. 7, the flow passage area of the internal connecting pipe 27 is smaller than the flow passage area of the first exhaust pipe 21. Specifically, the flow passage area of the internal connecting pipe 27 is smaller than the flow passage area of the first collecting pipe 215. The flow passage area of the internal connecting pipe 27 is smaller than the flow passage area of the second collecting pipe 216.

The internal connecting pipe 27 is located below a space between the first collecting pipe 215 and the second collecting pipe 216. A top portion of the internal connecting pipe 27 is located above a bottom portion of the first collecting pipe 215 and a bottom portion of the second collecting pipe 216. The top portion of the internal connecting pipe 27 is located below the center O1 of the first collecting pipe 215 and the center O2 of the second collecting pipe 216. A bottom portion of the internal connecting pipe 27 is located below the bottom portion of the first collecting pipe 215 and the bottom portion of the second collecting pipe 216. The first collecting pipe 215 is located above the right tapered surface 251. The second collecting pipe 216 is located above the left tapered surface 252.

As illustrated in FIG. 6, the connecting pipe portion 23 includes a second exhaust pipe 28, an exhaust control valve 29, and a third exhaust pipe 30. The second exhaust pipe 28 is connected to the expansion chamber located furthest to the rear among the plurality of expansion chambers 31 and 32. Specifically, the second exhaust pipe 28 is connected to the first expansion chamber 31. An end portion 281 of the second exhaust pipe 28 is located inside the first expansion chamber 31. The second exhaust pipe 28 is disposed so as to pass through a hole 222 in the rear surface of the first silencer 22. Specifically, the second exhaust pipe 28 is disposed so as to pass through the hole 222 in the rear surface of the expansion portion 26. The end portion 281 of the second exhaust pipe 28 is located higher than the first end portion 271 of the internal connecting pipe 27. The end portion 281 of the second exhaust pipe 28 is located higher than the end portion 211 of the first exhaust pipe 21. The second exhaust pipe 28 is disposed higher than the third exhaust pipe 30. The length of the second exhaust pipe 28 is shorter than the length of the third exhaust pipe 30.

Figure 8:
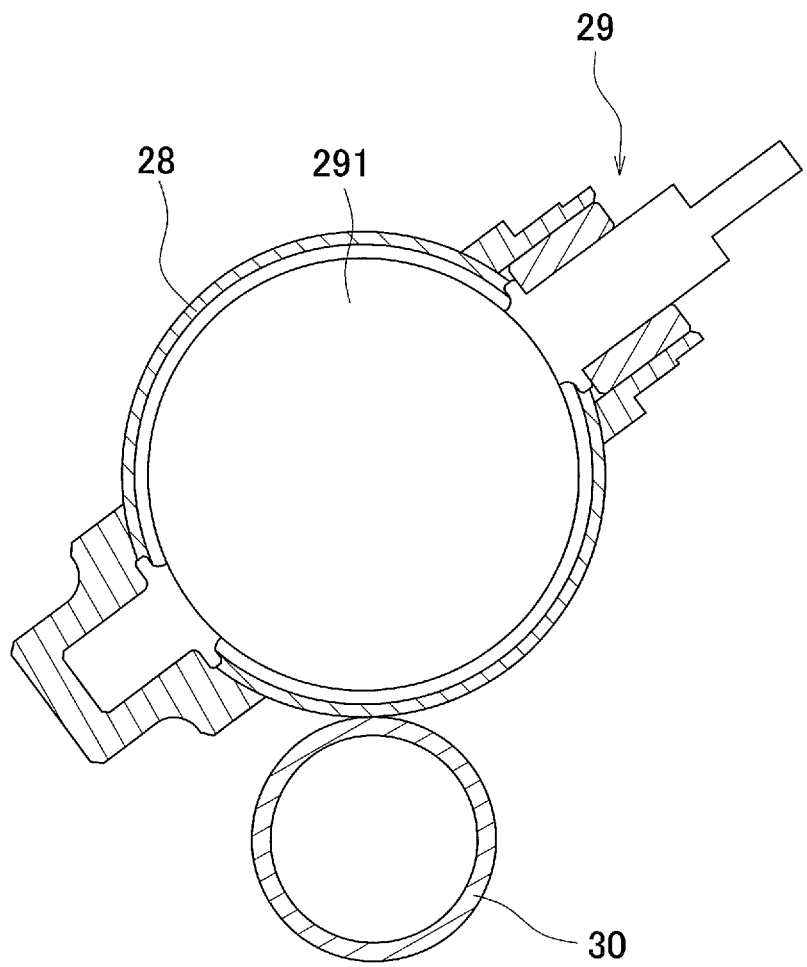
FIG. 8 is a cross-sectional view of an exhaust control valve.

The exhaust control valve 29 is located in the second exhaust pipe 28. The exhaust control valve 29 is attached to the second exhaust pipe 28. The exhaust control valve 29 controls the flow passage area of the second exhaust pipe 28. In other words, the exhaust control valve 29 opens and closes the passage of the second exhaust pipe 28. FIG. 8 is a cross-sectional view of the exhaust control valve 29. As illustrated in FIG. 8, the exhaust control valve 29 includes an obturating element 291. The passage of the second exhaust pipe 28 is opened and closed by controlling the position of the obturating element 291.

As illustrated in FIG. 5, the third exhaust pipe 30 is connected to the second expansion chamber 32. An end portion 301 of the third exhaust pipe 30 is located inside the second expansion chamber 32. The third exhaust pipe 30 is disposed so as to pass through a hole 223 in the rear surface of the first silencer 22. The third exhaust pipe 30 is disposed so as to pass through the first expansion chamber 31 and a hole 363 in the partition wall member 36. The end portion 301 of the third exhaust pipe 30 is located higher than the second end portion 272 of the internal connecting pipe 27. The end portion 301 of the third exhaust pipe 30 is located rearward of the second end portion 272 of the internal connecting pipe 27. A top portion of the end portion 301 of the third exhaust pipe 30 is located higher than the top portion of the first exhaust pipe 21. A bottom portion of the end portion 301 of the third exhaust pipe 30 is located lower than the top portion of the first exhaust pipe 21. The end portion 301 of the third exhaust pipe 30 is located to the right of the first exhaust pipe 21. The flow passage area of the third exhaust pipe 30 is smaller than the flow passage area of the first collecting pipe 215. The flow passage area of the third exhaust pipe 30 is smaller than the flow passage area of the second collecting pipe 216. As illustrated in FIG. 8, the flow passage area of the third exhaust pipe 30 is no greater than the maximum flow passage area of the second exhaust pipe 28. Specifically, the internal diameter of the third exhaust pipe 30 is no greater than the internal diameter of the second exhaust pipe 28.

The connecting pipe portion 23 includes a coupling pipe 34. The coupling pipe 34 connects the second exhaust pipe 28 with the third exhaust pipe 30. The coupling pipe 34 is connected to the second silencer 24.

Figure 9:
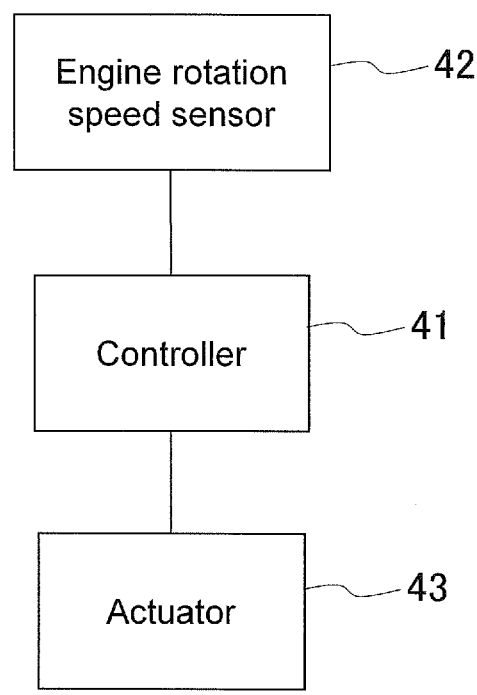
FIG. 9 is a schematic view illustrating a control system of the motorcycle.

FIG. 9 is a schematic view of a control system of the motorcycle 1. As illustrated in FIG. 9, the motorcycle 1 includes a controller 41, an engine rotation speed sensor 42, and an actuator 43. The controller 41 is an electronic control device including a calculation device such as a CPU, and a recording device such as a memory. The engine rotation speed sensor 42 detects the rotation speed of the engine 3. The engine rotation speed sensor 42 sends a signal indicating the detected rotation speed of the engine 3 to the controller 41. The actuator 43 actuates the exhaust control valve 29. For example, the actuator 43 is an electric motor and is connected to the exhaust control valve 29 by a wire, for example. The controller 41 is programmed to modify the opening degree of the exhaust control valve 29 by controlling the actuator 43. Specifically, the controller 41 is programmed to control the flow passage area of the second exhaust pipe 28 by controlling the actuator 43.

Figure 10:
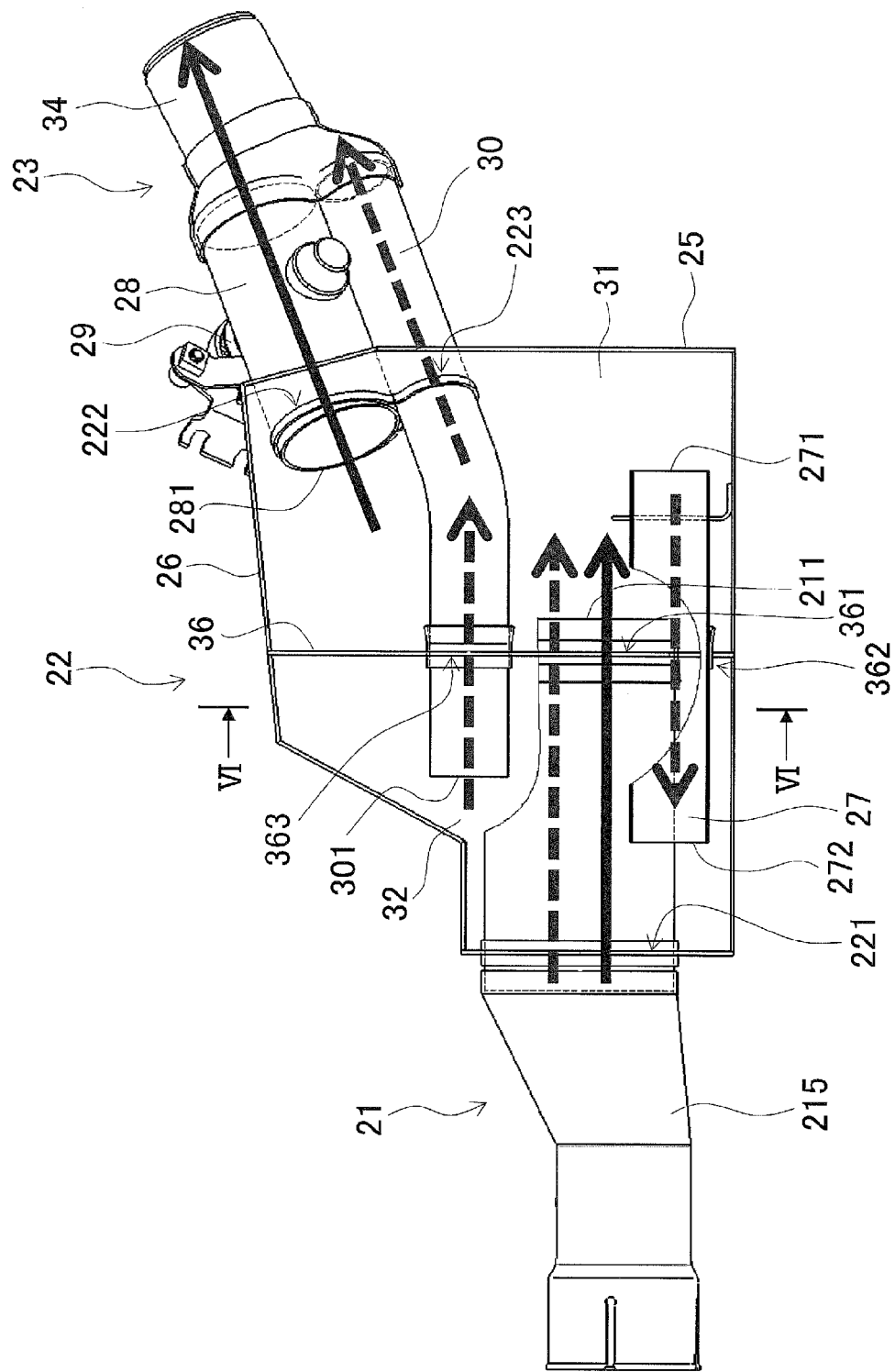
FIG. 10 is a view illustrating the exhaust flow of the first silencer.

The controller 41 is programmed to modify the opening degree of the exhaust control valve 29 in response to the engine rotation speed. The controller 41 is programmed to send a command signal to the actuator 43 to close the exhaust control valve 29 when the engine rotation speed is within a certain low-speed range. FIG. 10 is a view illustrating the exhaust flow of the first silencer 22. When the exhaust control valve is in a closed state, the exhaust flows from the first exhaust pipe 21 through the first expansion chamber 31 and the second expansion chamber 32 to the third exhaust pipe 30 as illustrated with the dashed line arrows in FIG. 10. The exhaust then flows from the third exhaust pipe 30 through the coupling pipe 34 to the second silencer 24. In this manner, the passage length of the exhaust in the first silencer 22 is increased when the exhaust control valve is in a closed state.

The controller 41 is programmed to send a command signal to the actuator 43 to open the exhaust control valve 29 when the engine rotation speed is within a certain high-speed range. When the exhaust control valve is in an open state, the exhaust flows mainly from the first exhaust pipe 21 through the first expansion chamber 31 to the second exhaust pipe 28 without passing through the second expansion chamber 32 as illustrated with the solid line arrows in FIG. 10. The exhaust then flows from the second exhaust pipe 28 through the coupling pipe 34 to the second silencer 24. In this manner, the passage length of the exhaust in the first silencer 22 is decreased when the exhaust control valve 29 is in an open state. So long as most of the exhaust flows to the second exhaust pipe 28 without passing through the second expansion chamber 32, it is not necessary for all of the exhaust to avoid passing through the second expansion chamber 32.

The motorcycle 1 according to the present preferred embodiment includes the following features.

The exhaust flows, in order, from the exhaust port 17 of the engine 3 through the first exhaust pipe 21, the first silencer 22, the connecting pipe portion 23, and the second silencer 24. The passage length of the exhaust in the first silencer 22 can be modified with the exhaust control valve 29. Specifically, the exhaust control valve 29 is closed when traveling at low speeds. As a result of this arrangement, the passage length of the exhaust through the first silencer 22 is increased. The exhaust control valve 29 is opened when traveling at high speeds. As a result, the passage length of the exhaust through the first silencer 22 is decreased.

The silencing performance can be improved by increasing the passage length of the exhaust when traveling at slow speeds as described above. The output performance can be improved by decreasing the passage length of the exhaust when traveling at high speeds. Moreover, since the output performance can be improved without increasing the passage areas of the expansion chambers and the exhaust pipes, the first silencer 22 can be smaller. Furthermore, since the silencing performance can be improved by the first silencer 22, the second silencer 24 can be smaller.

At least a portion of the first silencer 22 is disposed between the engine 3 and the rear wheel 7 in the front-back direction of the vehicle. The second silencer 24 is disposed beside the rear wheel 7. An increase in the size of the silencers disposed at these locations causes the banking angle of the vehicle body to become smaller. Since the first silencer and the second silencer can be smaller in the motorcycle 1 according to the present preferred embodiment, a reduction in the banking angle of the vehicle body is prevented or minimized.

The internal diameter of the third exhaust pipe 30 is no greater than the internal diameter of the second exhaust pipe 28. Specifically, the flow passage area of the third exhaust pipe 30 is no greater than the maximum flow passage area of the second exhaust pipe 28. As a result, the silencing performance can be improved. In other words, the maximum flow passage area of the second exhaust pipe is no less than the flow passage area of the third exhaust pipe. As a result, the output performance can be improved.

The second exhaust pipe 28 is disposed higher than the third exhaust pipe 30. The exhaust control valve 29 can be disposed farther away from the ground surface since the exhaust control valve 29 is disposed on the second exhaust pipe 28. As a result, the exhaust control valve 29 can be prevented from coming into contact with the ground surface. Alternatively, a wire connecting the exhaust control valve 29 and the actuator 43 can be prevented from coming into contact with the ground surface.

The length of the second exhaust pipe 28 is shorter than the length of the third exhaust pipe 30. Therefore, the passage length of the exhaust is decreased when the exhaust control valve 29 is open. Accordingly, output performance can be further improved.

The second exhaust pipe 28 is connected to the first expansion chamber 31. Specifically, the second exhaust pipe 28 is connected to the expansion chamber located furthest to the rear among the plurality of expansion chambers 31 and 32. As a result, the length of second exhaust pipe 28 can be reduced. Therefore, the passage length of the exhaust is decreased when the exhaust control valve 29 is open. Accordingly, output performance is further improved.

The connecting pipe portion 23 is connected to the expansion portion 26 of the first silencer 22. The expansion portion 26 expands upward from the body portion 25. Therefore, a decrease in the distance between the bottom portion of the first silencer 22 and the ground surface is prevented or minimized.

The expansion portion 26 is disposed beside the link portion 161. Therefore, the first silencer 22 can be disposed in a compact manner while avoiding interference with the link portion 161.

The second exhaust pipe 28 is opened and closed in response to the rotation speed of the engine 3. As a result, a state for achieving a high output performance can be switched with a state for achieving a high silencing performance in accordance with the speed of the vehicle.

Figure 11:
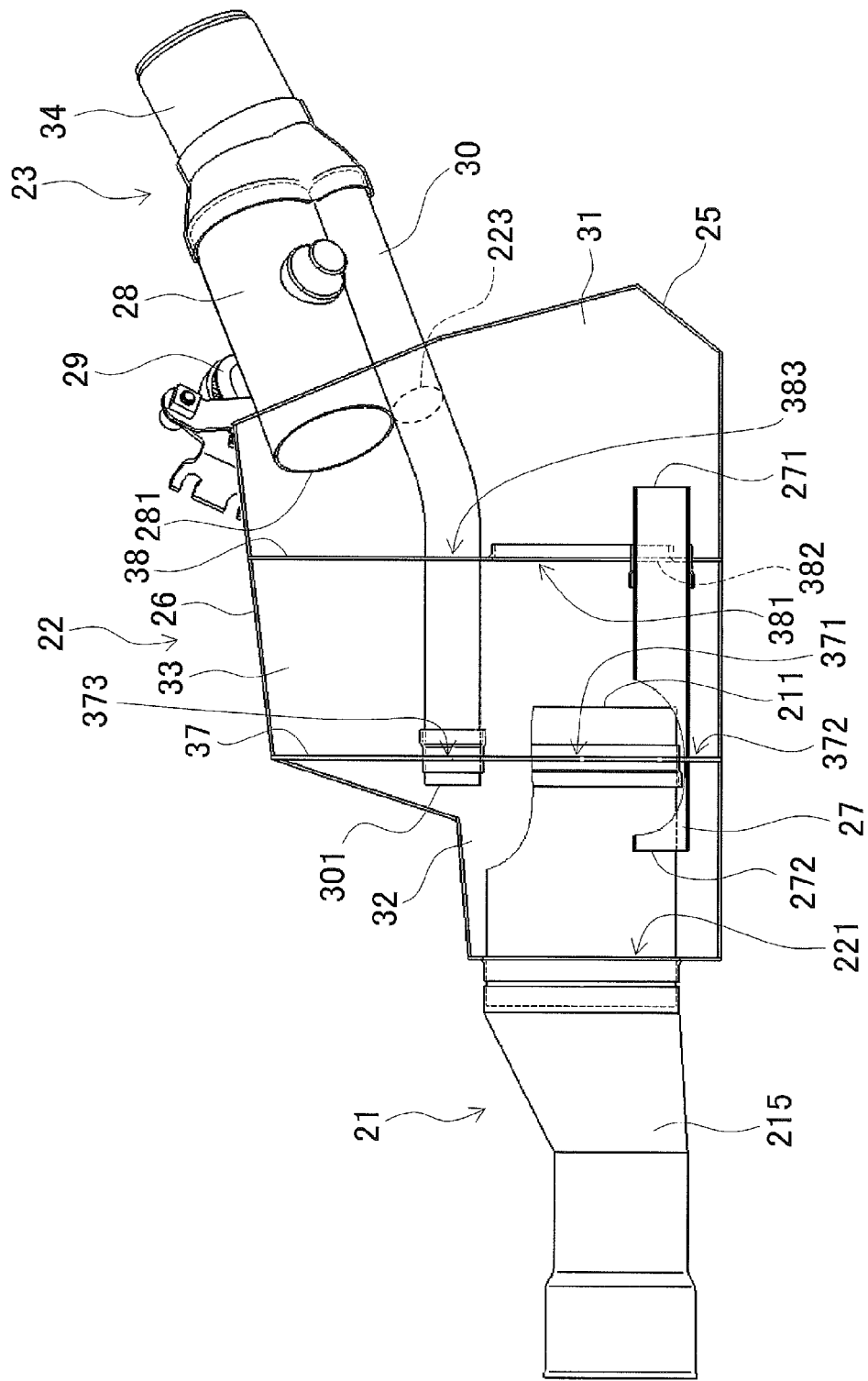
FIG. 11 is aside cross-sectional view of a first silencer according to a second preferred embodiment of the present invention.

The following is an explanation of a motorcycle according to a second preferred embodiment. FIG. 11 is a side cross-sectional view of the first silencer 22 in the motorcycle according to the second preferred embodiment.

As illustrated in FIG. 11, the inside of the first silencer 22 is partitioned into three expansion chambers 31, 32, and 33 to allow the exhaust to expand. Specifically, the first silencer 22 includes the first expansion chamber 31, the second expansion chamber 32, and a third expansion chamber 33. The first silencer 22 includes a first partition wall member 37 and a second partition wall member 38. The first partition wall member 37 partitions the third expansion chamber 33 and the second expansion chamber 32. The third expansion chamber 33 and the second expansion chamber 32 are disposed adjacent to each other with the first partition wall member 37 interposed therebetween. The second partition wall member 38 partitions the first expansion chamber 31 and the third expansion chamber 33. The first expansion chamber 31 and the third expansion chamber 33 are disposed adjacent to each other with the second partition wall member 38 interposed therebetween.

The first expansion chamber 31 is located rearward of the third expansion chamber 33. The first expansion chamber 31 is located farthest to the rear among the plurality of expansion chambers 31, 32, and 33. The first expansion chamber 31 is located farther upstream than the third exhaust pipe 30 in the exhaust flow. The third expansion chamber 33 is located upstream from the first expansion chamber 31 in the exhaust flow. An opening 381 is provided in the second partition wall member 38. The first expansion chamber 31 and the third expansion chamber 33 communicate via the opening 381 in the second partition wall member 38. The second expansion chamber 32 is located farther downstream than the first expansion chamber 31 in the exhaust flow. The second expansion chamber 32 is located in front of the third expansion chamber 33. The third expansion chamber 33 is located between the first expansion chamber 31 and the second expansion chamber 32 in the front-back direction of the vehicle.

The first exhaust pipe 21 is connected to the third expansion chamber 33. Specifically, the end portion 211 of the first exhaust pipe 21 is located inside the third expansion chamber 33. The first exhaust pipe 21 is disposed so as to pass through a hole 371 in the first partition wall member 37. The second exhaust pipe 28 is connected to the first expansion chamber 31. Specifically, the end portion 281 of the second exhaust pipe 28 is located inside the first expansion chamber 31.

The internal connecting pipe 27 connects the first expansion chamber 31 with the second expansion chamber 32. Specifically, the first end portion 271 of the internal connecting pipe 27 is disposed inside the first expansion chamber 31. The second end portion 272 of the internal connecting pipe 27 is disposed inside the second expansion chamber 32. The internal connecting pipe 27 is disposed so as to pass through a hole 372 in the first partition wall member 37 and a hole 382 in the second partition wall member 38. The internal connecting pipe 27 is disposed so as to pass through the third expansion chamber 33.

The third exhaust pipe 30 is connected to second expansion chamber 32. Specifically, the end portion 301 of the third exhaust pipe 30 is located inside the second expansion chamber 32. The third exhaust pipe 30 is disposed so as to pass through a hole 373 in the first partition wall member 37 and a hole 383 in the second partition wall member 38. The third exhaust pipe 30 is disposed so as to pass through the third expansion chamber 33.

Other features of the first silencer 22 according to the second preferred embodiment are preferably the same as those of the first silencer 22 according to the first preferred embodiment.

Figure 12:
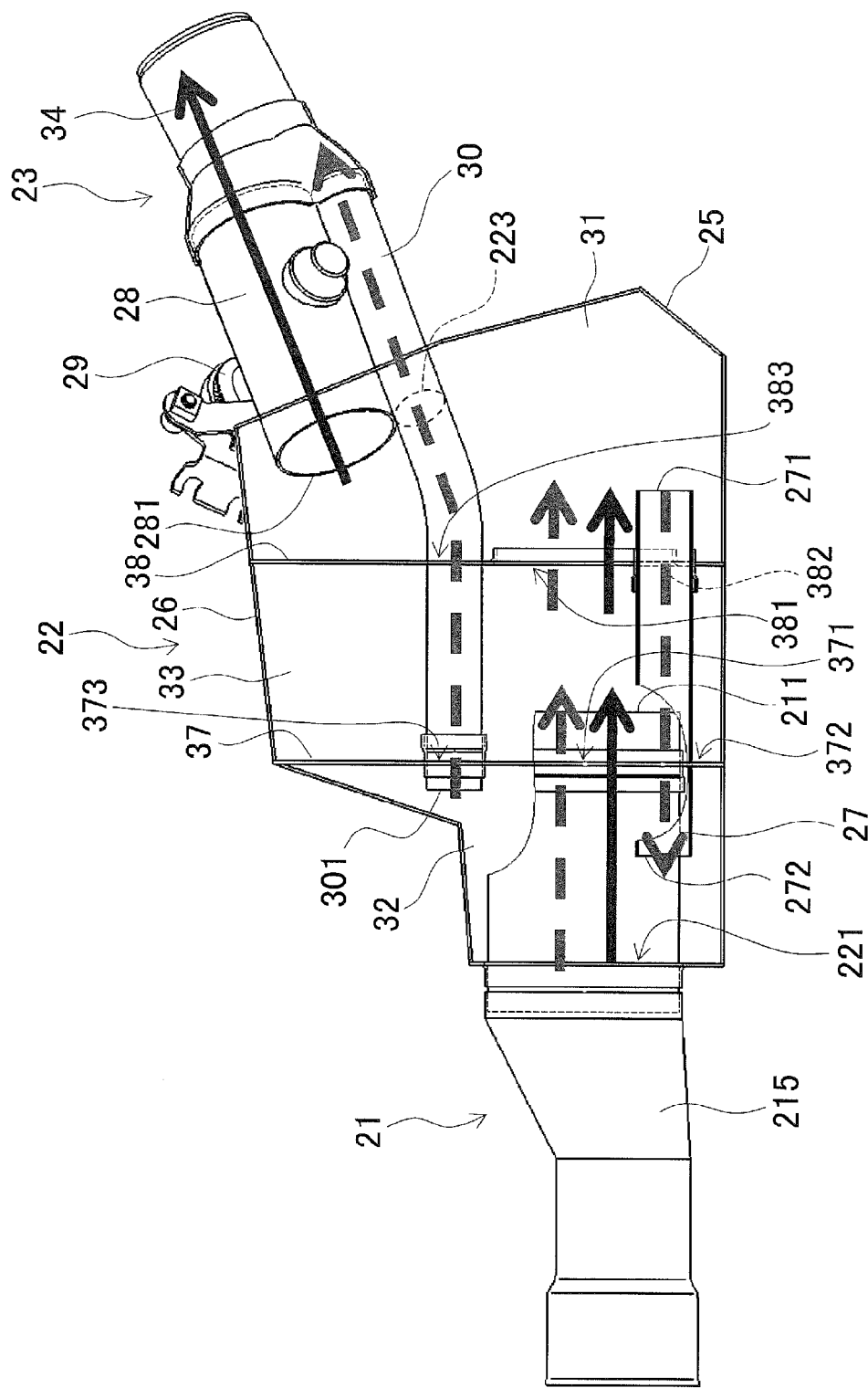
FIG. 12 is a view illustrating the exhaust flow of the first silencer.

The controller 41 is programmed to send a command signal to the actuator 43 to close the exhaust control valve 29 when the engine rotation speed is within a certain low-speed range. FIG. 12 illustrates an exhaust flow of the first silencer 22. When the exhaust control valve is in a closed state, the exhaust flows from the first exhaust pipe 21 through the third expansion chamber 33, the first expansion chamber 31, and the second expansion chamber 32 to the third exhaust pipe 30 as illustrated with the dashed line arrows in FIG. 12. The exhaust then flows from the third exhaust pipe 30 through the coupling pipe 34 to the second silencer 24. In this manner, the passage length of the exhaust in the first silencer 22 is increased when the exhaust control valve is in a closed state.

The controller 41 is programmed to send a command signal to the actuator 43 to open the exhaust control valve 29 when the engine rotation speed is within a certain high-speed range. When the exhaust control valve is in an open state, the exhaust flows mainly from the first exhaust pipe 21 through the third expansion chamber 33 and the first expansion chamber 31 to the second exhaust pipe 28 without passing through the second expansion chamber 32 as illustrated with the solid line arrows in FIG. 12. The exhaust then flows from the second exhaust pipe 28 through the coupling pipe 34 to the second silencer 24. In this manner, the passage length of the exhaust in the first silencer 22 is decreased when the exhaust control valve 29 is in an open state. So long as most of the exhaust flows to the second exhaust pipe 28 without passing through the second expansion chamber 32, it is not necessary for all of the exhaust to avoid passing through the second expansion chamber 32.

As described above, the same effects can be achieved with the motorcycle according to the second preferred embodiment as the motorcycle 1 according to the first preferred embodiment.

Figure 13:
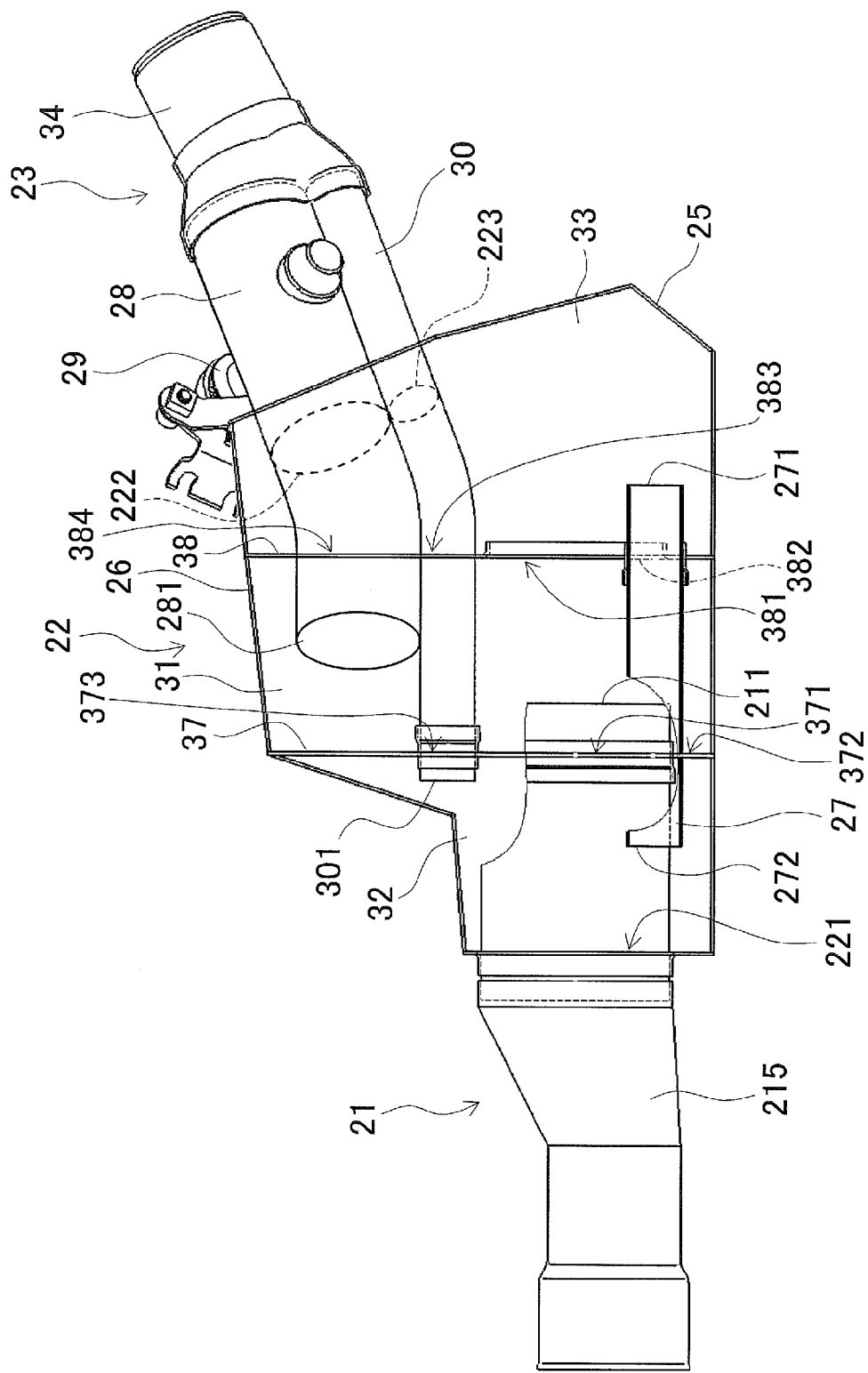
FIG. 13 is aside cross-sectional view of a first silencer according to a third preferred embodiment of the present invention.

The following is an explanation of a motorcycle according to a third preferred embodiment. FIG. 13 is a side cross-sectional view of the first silencer 22 in the motorcycle according to the third preferred embodiment.

As illustrated in FIG. 13, the inside of the first silencer 22 is partitioned into three expansion chambers 31, 32, and 33 to allow the exhaust to expand. Specifically, the first silencer 22 includes the first expansion chamber 31, the second expansion chamber 32, and a third expansion chamber 33. The first silencer 22 includes a first partition wall member 37 and a second partition wall member 38. The first partition wall member 37 partitions the first expansion chamber 31 and the second expansion chamber 32. The first expansion chamber 31 and the second expansion chamber 32 are disposed adjacent to each other with the first partition wall member 37 interposed therebetween. The second partition wall member 38 partitions the first expansion chamber 31 and the third expansion chamber 33. The first expansion chamber 31 and the third expansion chamber 33 are disposed adjacent to each other with the second partition wall member 38 interposed therebetween.

The first expansion chamber 31 is located in front of the third expansion chamber 33. The first expansion chamber 31 is located between the second expansion chamber 32 and the third expansion chamber 33 in the exhaust flow. The first expansion chamber 31 is located farther upstream than the third exhaust expansion chamber 33 in the exhaust flow. In other words, the third expansion chamber 33 is located downstream from the first expansion chamber 31 in the exhaust flow. The third expansion chamber 33 is located farthest to the rear among the plurality of expansion chambers 31, 32, and 33. An opening 381 is provided in the second partition wall member 38. The first expansion chamber 31 and the third expansion chamber 33 communicate via the opening 381. The second expansion chamber 32 is located farther downstream than the third expansion chamber 33 in the exhaust flow. The second expansion chamber 32 is located in front of the first expansion chamber 31.

The first exhaust pipe 21 is connected to the first expansion chamber 31. Specifically, the end portion 211 of the first exhaust pipe 21 is located inside the first expansion chamber 31. The first exhaust pipe 21 is disposed so as to pass through a hole 371 in the first partition wall member 37. The second exhaust pipe 28 is connected to the first expansion chamber 31. Specifically, the end portion 281 of the second exhaust pipe 28 is located inside the first expansion chamber 31. The second exhaust pipe 28 is disposed so as to pass through a hole 384 in the second partition wall member 38. The second exhaust pipe 28 is disposed so as to pass through the third expansion chamber 33.

The internal connecting pipe 27 connects the second expansion chamber 32 with the third expansion chamber 33. Specifically, the first end portion 271 of the internal connecting pipe 27 is disposed inside the third expansion chamber 33. The second end portion 272 of the internal connecting pipe 27 is disposed inside the second expansion chamber 32. The internal connecting pipe 27 is disposed so as to pass through a hole 372 in the first partition wall member 37 and a hole 382 in the second partition wall member 38. The internal connecting pipe 27 is disposed so as to pass through the first expansion chamber 31.

The third exhaust pipe 30 is connected to second expansion chamber 32. Specifically, the end portion 301 of the third exhaust pipe 30 is located inside the second expansion chamber 32. The third exhaust pipe 30 is disposed so as to pass through a hole 373 in the first partition wall member 37 and a hole 383 in the second partition wall member 38. The third exhaust pipe 30 is disposed so as to pass through the first expansion chamber 31.

Other features of the first silencer 22 according to the third preferred embodiment are preferably the same as those of the first silencer 22 according to the first preferred embodiment.

Figure 14:
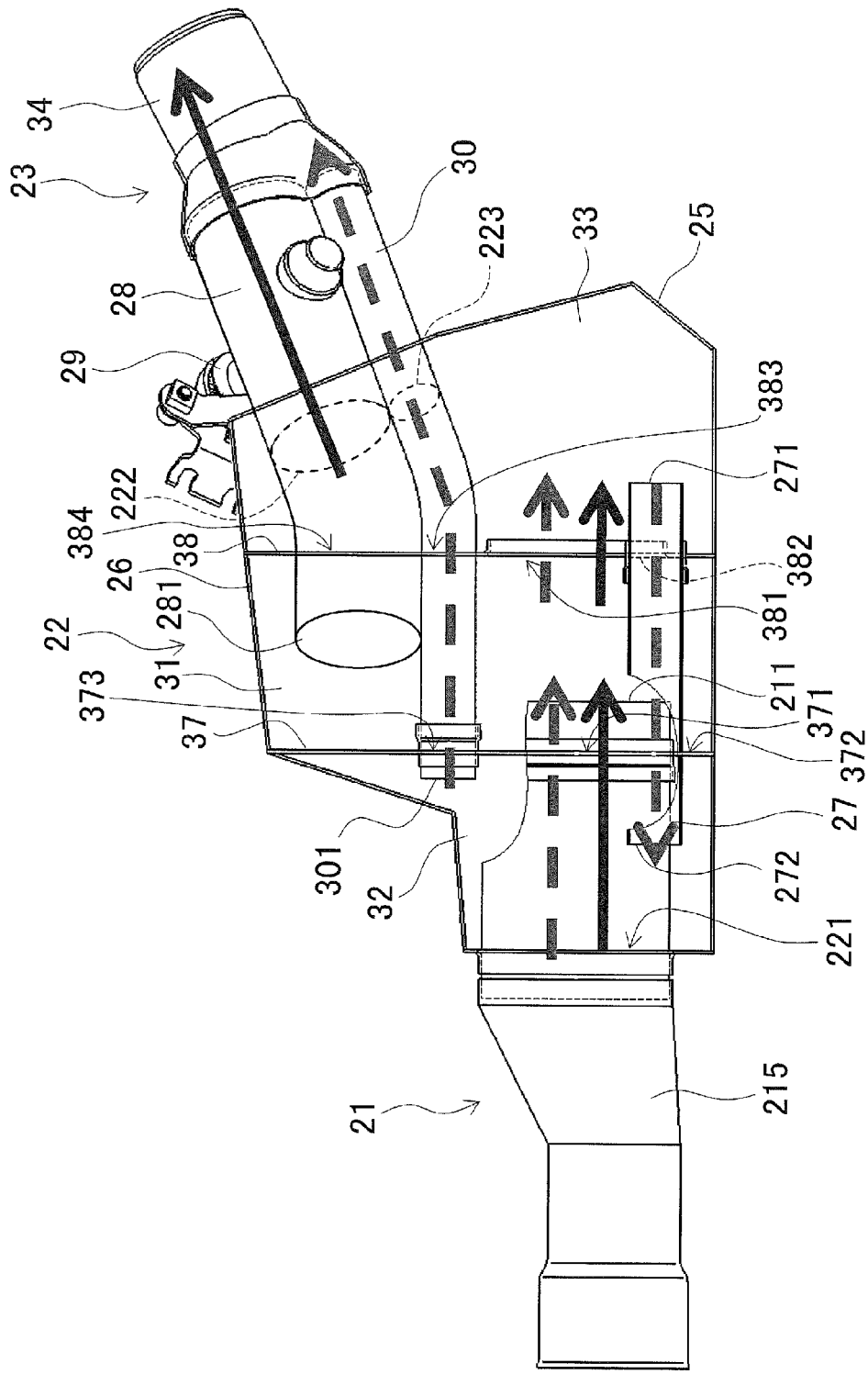
FIG. 14 is a view illustrating the exhaust flow of the first silencer.

The controller 41 is programmed to send a command signal to the actuator 43 to close the exhaust control valve 29 when the engine rotation speed is within a certain low-speed range. FIG. 14 is a view illustrating the exhaust flow of the first silencer 22. When the exhaust control valve is in a closed state, the exhaust flows from the first exhaust pipe 21 through the first expansion chamber 31, the third expansion chamber 33, and the second expansion chamber 32 to the third exhaust pipe 30 as illustrated with the dashed line arrows in FIG. 14. The exhaust then flows from the third exhaust pipe 30 through the coupling pipe 34 to the second silencer 24. In this manner, the passage length of the exhaust in the first silencer 22 is increased when the exhaust control valve is in a closed state.

The controller 41 is programmed to send a command signal to the actuator 43 to open the exhaust control valve 29 when the engine rotation speed is within a certain high-speed range. When the exhaust control valve is in an open state, the exhaust flows mainly from the first exhaust pipe 21 through the first expansion chamber 31 to the second exhaust pipe 28 without passing through the third expansion chamber 33 or the second expansion chamber 32 as illustrated with the solid line arrows in FIG. 14. The exhaust then flows from the second exhaust pipe 28 through the coupling pipe 34 to the second silencer 24. In this manner, the passage length of the exhaust in the first silencer 22 is decreased when the exhaust control valve 29 is in an open state. So long as most of the exhaust flows to the second exhaust pipe 28 without passing through the third expansion chamber 33 or the second expansion chamber 32, it is not necessary for all of the exhaust to avoid passing through the third expansion chamber 33 and the second expansion chamber 32.

As described above, the same effects as the motorcycle 1 according to the first preferred embodiment can be achieved in the motorcycle according to the third preferred embodiment.

Although preferred embodiments of the present invention have been described so far, the present invention is not limited to the above preferred embodiments and various modifications may be made within the scope of the invention.

The number of expansion chambers in the first silencer 22 is not limited to two or three. The first silencer 22 may include more expansion chambers. The dispositions of the first expansion chamber 31 and the second expansion chamber 32 may be modified without being limited to those described in the first preferred embodiment. The dispositions of the first expansion chamber 31, the second expansion chamber 32, and the third expansion chamber 33 may be modified without being limited to those described in the second and third preferred embodiments.

The shape and disposition of the first silencer 22 may be modified without being limited to the shape and disposition described in the first preferred embodiment. The shape and disposition of the second silencer 24 may be modified without being limited to the shape and disposition described in the first preferred embodiment.

The number of collecting pipes in the first exhaust pipe 21 is not limited to two and may be three or more. Alternatively, the first exhaust pipe 21 may only have one collecting pipe.

The second silencer 24 is connected to the second exhaust pipe 28 and the third exhaust pipe 30 via the coupling pipe 34 in the first preferred embodiment. However, the second silencer 24 may be connected to the second exhaust pipe 28 and the third exhaust pipe 30 individually.

The closed state of the exhaust control valve 29 is not limited to a fully closed state and may be a state of being opened to a certain opening degree. The open state of the exhaust control valve 29 is not limited to a fully open state and may be a state of being opened to a certain opening degree greater than an opening degree in a closed state. Specifically, the flow passage area of the second exhaust pipe 28 when the exhaust control valve 29 is in a closed state is preferably smaller than the flow passage area of the second exhaust pipe 28 when the exhaust control valve is in an open state.

The flow passage area of the third exhaust pipe 30 may be larger than the maximum flow passage area of the second exhaust pipe 28. Specifically, the internal diameter of the third exhaust pipe 30 may be greater than the internal diameter of the second exhaust pipe 28.

The shapes and dispositions of the first exhaust pipe 21, the second exhaust pipe 28, and the third exhaust pipe 30 may be modified without being limited to the shapes and dispositions described in the first preferred embodiment. The length of the second exhaust pipe 28 may be greater than the length of the third exhaust pipe 30.

The switching of the opening and closing of the exhaust control valve 29 is not limited to the rotation speed of the engine 3 and may be switched in response to the vehicle speed. Alternatively, the opening and closing of the exhaust control valve 29 may be performed manually.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
   an engine including an exhaust port;
   a first silencer;
   a second silencer separate from the first silencer;
   a first exhaust pipe connecting the exhaust port and the first silencer; and
   a connecting pipe portion connecting the first silencer and the second silencer; wherein
   the first silencer includes:
   a first expansion chamber to allow exhaust to expand, the first expansion chamber being located downstream of the first exhaust pipe in an exhaust flow; and
   a second expansion chamber to allow exhaust to expand, the second expansion chamber being partitioned from the first expansion chamber, the second expansion chamber being located farther downstream than the first expansion chamber; and
   the connecting pipe portion includes:
   a second exhaust pipe connected to the first expansion chamber;
   an exhaust control valve to control a flow passage area of the second exhaust pipe, the exhaust control valve being located in the second exhaust pipe; and
   a third exhaust pipe connected to the second expansion chamber.

2. The motorcycle according to claim 1, further comprising a rear wheel disposed rearward of the engine; wherein
   at least a portion of the first silencer is disposed between the engine and the rear wheel in a front-back direction of the vehicle; and
   the second silencer is disposed beside the rear wheel.

3. The motorcycle according to claim 1, wherein a flow passage area of the third exhaust pipe is less than or equal to a maximum flow passage area of the second exhaust pipe.

4. The motorcycle according to claim 3, wherein an internal diameter of the third exhaust pipe is less than or equal to an internal diameter of the second exhaust pipe.

5. The motorcycle according to claim 1, wherein the second exhaust pipe is disposed higher than the third exhaust pipe.

6. The motorcycle according to claim 1, wherein a length of the second exhaust pipe is smaller than a length of the third exhaust pipe.

7. The motorcycle according to claim 1, wherein the first silencer includes a partition wall member to partition the first expansion chamber and the second expansion chamber;
   the first expansion chamber and the second expansion chamber are disposed adjacent to each other with the partition wall member interposed therebetween; and the first exhaust pipe is connected to the first expansion chamber.

8. The motorcycle according to claim 1, wherein the first silencer further includes a third expansion chamber to allow expansion of the exhaust;

the third expansion chamber is located upstream from the first expansion chamber in the exhaust flow; and the first exhaust pipe is connected to the third expansion chamber.

9. The motorcycle according to claim 1, wherein the first silencer further includes a third expansion chamber to allow expansion of the exhaust;

the third expansion chamber is located between the first expansion chamber and the second expansion chamber in the exhaust flow; and the first exhaust pipe is connected to the first expansion chamber.

10. The motorcycle according to claim 1, wherein the first silencer includes a plurality of expansion chambers including the first expansion chamber and second expansion chamber; and the second exhaust pipe is connected to an expansion chamber located farthest to a rear of the motorcycle among the plurality of expansion chambers.

11. The motorcycle according to claim 1, wherein the first silencer includes a body portion and an expansion portion expanding upward from the body portion, and the connecting pipe portion is connected to the expansion portion.

12. The motorcycle according to claim 11, further comprising:

a main body;

a rear arm disposed above the main body;

a suspension; and a link portion coupling the rear suspension and the rear arm; wherein the expansion portion is disposed beside the link portion.

13. The motorcycle according to claim 1, wherein the exhaust control valve makes the flow passage area of the second exhaust pipe when a rotation speed of the engine is within a certain low-speed range smaller than the flow passage area of the second exhaust pipe when the rotation speed of the engine is within a certain high-speed range that is greater than the certain low-speed range.

\* \* \* \* \*